April 16, 1963     G. ALFIERI     3,085,835
BRAKING ARRANGEMENT WITH A PAIR OF SUBSEQUENTLY
OPERATED BRAKE INITIATING MEANS
Filed Oct. 5, 1959     2 Sheets-Sheet 1

INVENTOR.
Giuseppe Alfieri
BY
Michael S. Striker

United States Patent Office 3,085,835
Patented Apr. 16, 1963

3,085,835
BRAKING ARRANGEMENT WITH A PAIR OF SUBSEQUENTLY OPERATED BRAKE INITIATING MEANS
Giuseppe Alfieri, Milan, Italy, assignor to Fabbrica Italiana Magneti Marelli S.p.A., Milan, Italy
Filed Oct. 5, 1959, Ser. No. 844,520
Claims priority, application Italy Oct. 8, 1958
5 Claims. (Cl. 303—53)

This invention refers to pressure air distributors for pneumatic braking arrangements, particularly for vehicles, and comprises substantially an operation push rod connected to the brake pedal, and a member, that is resiliently operated by said push rod to act upon the inlet valve of a pressure fluid operated brake.

It is already known, that many vehicles and especially the heavier ones are provided with an engine brake device for the purpose of obtaining a speed decrease of the vehicle, said brake device being constituted substantially by a regulable member, that is arranged in the exhaust pipe to hinder exhaust of burnt gas to thus apply a braking action on the engine.

In the known embodiments the operation of the engine brake is obtained by means of suitable lever systems, that are directly operable by hand from the driver seat or by switching on the electric contact associated with the motion of brake pedal.

It is an object of present invention to embody a novel distributor, through which it is possible to operate also the engine brake device in advance to the pressure air operated brake.

Particularly, the engine brake, by decreasing the engine speed, acts upon the driving car and therefore its advance action is to be understood as referring to the activation of the air distributor controlling the brake section or sections of the driving car or tractor.

The air distributor embodies according to the invention a control switch of the engine brake which control switch is actuated before opening of the inlet valve in the driving car section.

The whole stroke of the operating member of an air distributor comprises a first stroke part to close the outlet ducts and a second stroke part to cause opening of the inlet valve or valves. In the novel air distributor closing of the engine brake switch takes place during the first stroke part.

The passage from the first to the second stroke part is resisted by a reaction spring.

Said spring operates in the time when the motion of the operating member causes beginning of the opening stroke of air distributor valve or valves by means of the push rod.

The driver can exactly control in such a way the passage from the step of outlet closing, during which operation of the engine brake takes place, to that one of air feeding to the operating members. When therefore only vehicle speed decreasing is required, then the driver can confine the ar distributor operation only to the control of the engine brake, by discontinuing his action upon the brake pedal when feeling that operation of said spring takes place.

The invention will be specified with reference to the accompanying drawings, wherein.

Figure 3:
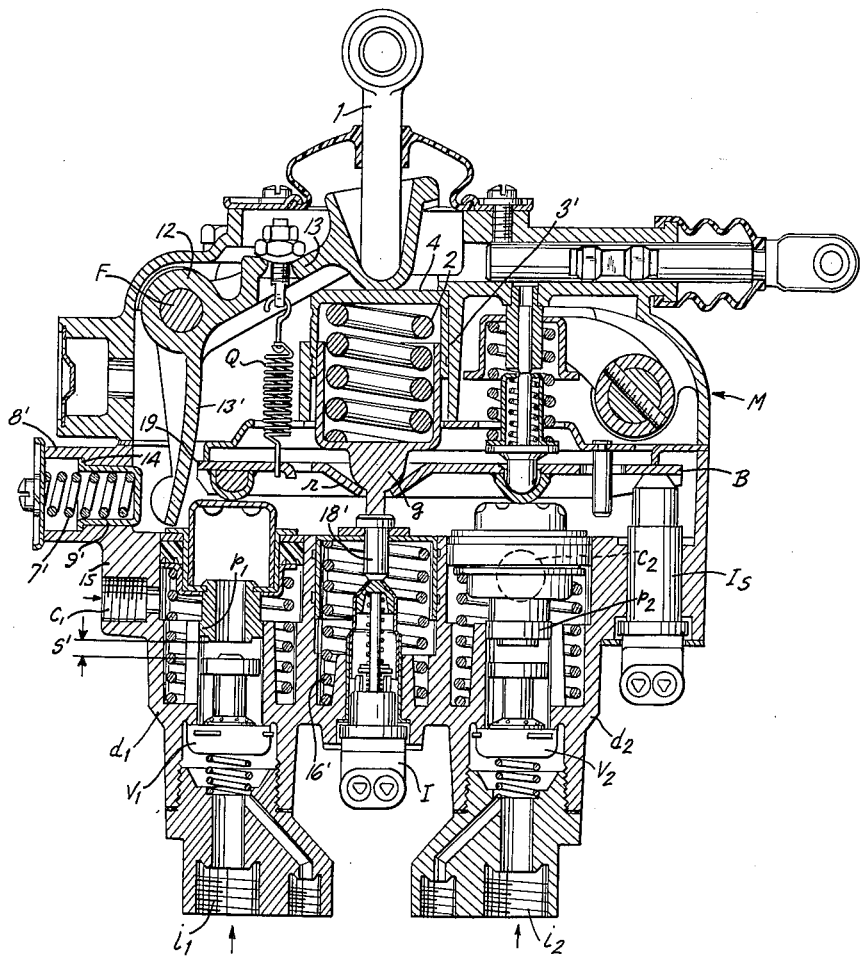

FIG. 3 shows the switch application to a particular double air distributor. In the simple (or with a single section) air distributor of FIG. 1, with 1 is indicated the push rod as connected to the brake pedal, that does not appear in the drawing, and with 2 the regulation spring through which the push rod force is transmitted to the driving plunger 3.

More precisely the regulation spring is arranged between the bottom 3' of plunger 3 and the cup 4, on which the push rod 1 acts through of the guide 5.

This guide 5 protrudes upwards beyond the air distributor body and ends in an outwardly bent edge 6 by which it acts during the operation upon the upper bearing of the prestressed reaction spring 7.

This spring 7 abuts with one end against the wall 8 secured to the air distributor body and with the other end against a movable cup 9, engaging with the upper wall P of the air distributor and projecting at the side of the guide 5, so that said guide can cause motion of ends 9 downwards after the initial or closing stroke.

The plunger 3 controls by means of push rod $p$ the inlet valve V to convey the air from the feeding pipe $i$ to the duct $e$ which leads to the braking section.

A switch I is arranged at one side of the air distributor and the push rod thereof is operated, by projecting with its funnel shaped end 10 inwards of the air distributor, and engaging an associated surface 11 of the plunger wall.

The switch I controls the operation circuit of engine brake and possibly also the circuit of stop lamp.

Figure 1:
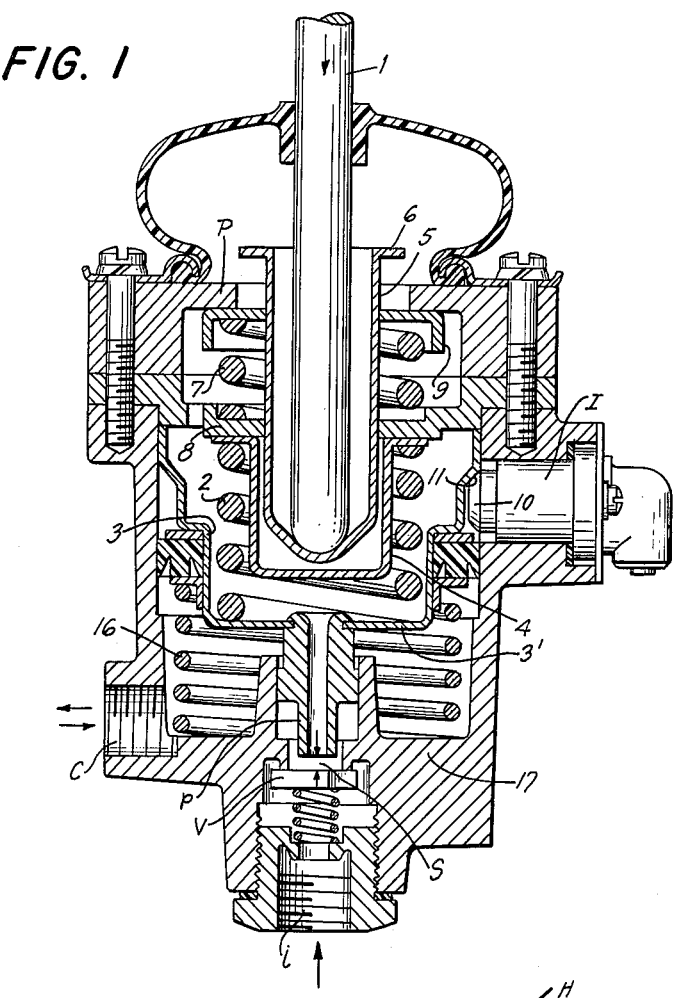
FIG. 1 illustrates the operation diagram of a simple air distributor provided with an engine brake switch.

The operation of the device—that in the FIG. 1 is at rest—is as follows: the driver causes motion of the push rod 1 in the direction of arrow by acting upon the brake pedal. The push rod drags along in its motion the guide 5 which by acting on the cup 4, transmits the motion through the spring 2 to the plunger 3, against the force of first spring means constituted by a spring 16 arranged between plunger 3 and a wall 17 of the air distributor, which tends to keep the cup 3 and therewith cup 4, guide 5 and push rod 1 in the rest position shown in FIG. 1.

Motion of push rod 10 of switch I and then closing of control circuit of engine brake and possibly stop lamp is caused at the beginning of plunger stroke; in this time operation of engine brake takes place.

During the following plunger motion, the end of push rod $p$ strikes against valve V after the stroke $s$ and the edge 6 of guide 5 engages cup 9 of the second spring means constituted by the spring 7. The reaction of spring 7 opposes the motion of push rod 1.

A further stroke is required for a gradual lifting of valve V, which begins therefore as soon as the driver has applied to the brake pedal such a force as to overcome the resistance of said prestressed spring 7. By following his action on the brake pedal, the driver causes the usual braking with the pressure air operated brake.

Figure 2:
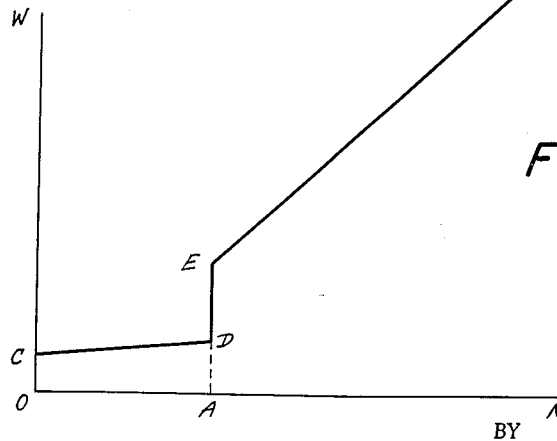
FIG. 2 shows a line representing the loads applied to the brake pedal depending on the stroke thereof.

This operation is illustrated in FIG. 2, wherein the ordinate OW represents the loads as applied to the brake pedal, and the abscissa ON refers to the strokes of push rod.

OC is the load at which push rod stroke begins. The next light climbing line CD indicates the load alteration during the step of outlet closing that corresponds to the stroke $s$ of push rod $p$. OA is the abscissa corresponding to said stroke $s$. The vertical line DE shows the load as absorbed by spring 7 before lifting of valve V by means of push rod $p$.

This latter load alteration indicates to the driver the passage from the operation of the engine brake alone to the next step of the braking section operation as illustrated by the line EH.

FIG. 3 shows the operation diagram of a double air distributor provided with a hand operable device M to cause braking of a distribution section and with a device Q to carry out advance braking of this section as to the other one.

Said kind of double air distributor is broadly specified in other United States patent application of the same inventor filed under Serial No. 831,325 on August 3, 1959.

It is assumed that the section provided with the device M be that one connected to the braking members of trailer or semitrailer. The device Q is therefore fitted to the control members of the tractor to the purpose of obtaining the advance operation of the trailer section as to the tractor section. Also in this case 1 indicates the push rod and 2 the regulation spring resiliently connecting said push rod to rocking lever B. The air distributor $d1$ of the tractor braking section is controlled by an end of this rocking lever and the air distributor $d2$ of trailer braking section is controlled by the other end thereof as said above.

The air distributors $d1$ and $d2$ are of a well known kind and each one of them comprises:

A push rod ($p1$—$p2$) for the control of the inlet valve ($V1$—$V2$), a feeding pipe ($i1$—$i2$) and a duct ($c1$—$c2$) directed to the braking sections.

The regulation spring 2 is arranged between the cups 4 and 3' of which the first one undergoes the action of push rod 1, whereas the other one acts upon the rocking lever B through the rod 18.

Said rod 18 engages with rocking lever B by means of ball $g$ secured to the rod and arranged in a suitable seat $r$ of said rocking lever so that this latter can perform a free rotation movement about this ball and in the same time motion thereof is caused by the operation of the brake pedal.

At one side of distributor $d2$ is a stop switch IS; closing of said switch is caused by means of rocking lever projection L in the step of air distributor brake pedal operation as well as in the hand operation step of reaction $d2$.

In the first case closing of switch IS takes place through downward motion of whole rocking lever B, whereas in the second case said closing is performed by clockwise rotation of said rocking lever about ball $g$.

A rod 18' extends in direction of rod 18 beyond the ball $g$ for operating the engine brake switch I arranged in the lower part of the distributor. First spring means constituted by the spring 16' and connected to rod 18' tends to keep rods 18' and 18 and therewith the push rod 1 in the rest position shown in FIG. 3.

The advance device Q, is constituted substantially by a tension spring, which is connected at its lower part to the rocking lever B—at the side of air distributor $d1$—and at its upper part to the arm 13 of the crank lever 12.

Said lever 12 is hinged at F to the apparatus body and therefore a rotation movement of the arm 13 causes a rotation motion of the other arm 13'.

The cup 4 of the regulation spring 2 is in contact with a curved end of arm 13 on which the push rod 1 acts. The end of the other arm 13' is adapted to act upon second spring means constituted by a prestressed spring 7', arranged in a housing 8' secured to the side 15 of air distributor body.

Said spring 7' has the purpose of resisting the passage from the operation step of air outlet closing—corresponding to the stroke S' of push rod $p1$ to the opening step of valve V1 of air distributor $d1$.

The end of arm 13' is, in the rest position shown in FIG. 3, not in contact with the reaction spring 7' but engages with it only after an initial stroke.

The end of arm 13' causes motion of cup 9', which slides in the housing 8', and which is under the action of prestressed spring 7'.

Shoulders 14 engaging with corresponding projections of wall 15 limit inward movement of cup 9'.

The operation of the double air distributor is similar to the operation of the single air distributor, that is: downward motion of push rod 1 is transmitted through spring 2 and rod 18 to ball $g$ and from there through rod 18' to switch I, closing the latter, which in turn causes operation of the engine brake. During this part of the stroke the tension spring Q, attached to lever B between ball $g$ and the curved end 19 of lever B engaging the spring biased member P, causes clockwise turning of the lever B, so that the right portion of lever B, as viewed in FIG. 3, acts on the spring biased member $p2$ to open the valve V2 of the trailer braking section.

In the usual operation the braking action of the engine brake on the tractor takes place after the pneumatic action of the corresponding distributor on the trailer or semitrailer and is in advance as to the pneumatic braking of the tractor. It is of course possible, however, to reverse said operation sequence.

It might be sometimes desirable that the engine brake operation in advance or even simultaneous with the braking action of trailer or semitrailer. Moreover, it frequently happens, that the vehicle speed decrease can be carried out and maintained by the engine brake alone.

A further downward motion of push rod 1 and turning motion of arm 13 causes a gradual exclusion of the advance spring Q until a lowering motion of rocking lever arm controlling the tractor brake section $d1$ takes place under the action of push rod 1.

The tractor pneumatic braking starts particularly when the push rod $p1$, after covering the distance S', begins lifting of valve V1.

When push rod $p1$ strikes against valve V1, the end of arm 13' of crank lever 12 engages at the same time with cup 9' of spring 7'.

In this operation step the tractor air distributor $d1$ has performed outlet closing, and opening of valve V1 to feed the braking section is now revealed by spring 7' opposing to further motion of arm 13' and push rod 1.

After overcoming of resistance of spring 7' opening of valve V1 and tractor pneumatic braking begins.

Operation of the engine brake during the pedal control of air distributor is allowed by the arrangement of switch I, which does not interfere with operation of device M, when a braking action only on trailer or semitrailer is desired. In this case the rocking lever carries out a clockwise rotation about the ball $g$ and rod S', but does not cause operation of switch I, since the latter is not pushed downwards.

The engine brake is cut out in such a way during the hand braking of only the trailer or semitrailer section.

I claim:

1. A braking arrangement comprising, in combination, first brake initiating means; second brake initiating means spaced from said first brake initiating means in one direction; operator controlled operating means movable by the operator in said one direction from a rest position to a first operating position for actuating said first brake initiating means and to a second operating position for actuating said second brake initiating means while maintaining said first brake initiating means active; first spring means engaging said operating means and permanently tending to move the same from said operating to said rest position thereof; second spring means biased to resist movement of said operating means from said first to said second operating position when connected to the same; and connecting means arranged on said operating means in such a manner as to be engaged by said second spring means only at the moment when said operating means has been moved by the operator from said rest to said first operating position thereof and to remain in such engagement and connect said second spring means to said operating means during movement of said operating means by the operator between said first and said second operating positions, whereby said second spring means resists movement of said operating means from said first to said second operating position thereof.

2. A braking arrangement comprising, in combination, first valve means movable between a closed and an open position in which said first valve means is adapted to direct fluid under pressure to a first brake means and including a first spring biased member operable to open said first valve means upon stressing of its spring; second valve means spaced from said first valve means in one direction and being movable between a closed and an open position in which said second valve means is adapted to direct fluid under pressure to a second brake means and including a second spring biased member operable to open said second valve means upon stressing of its spring; operator controlled operating means movable by the operator in said one direction from a rest position to a first operating position for operating said first spring biased member so as to open said first valve means and to a second operating position for actuating said second spring biased member to open said second valve means while keeping said first valve means open; first spring means engaging said operating means and permanently tending to move the same from said operating to said rest position thereof, second spring means biased to resist movement of said operating means from said first to said second operating position when connected to the same; and connecting means arranged on said operating means in such a manner as to be engaged by said second spring means only at the moment when said operating means has been moved by the operator from said rest to said first operating position thereof and to remain in such engagement and connect said second spring means to said operating means during movement of said operating means by the operator between said first and said second operating positions, whereby said second spring means resists movement of said operating means from said first to said second operating position thereof.

3. A braking arrangement comprising, in combination, first valve means movable between a closed and an open position in which said first valve means is adapted to direct fluid under pressure to a first brake means and including a first spring biased member operable to open said first valve means upon stressing of its spring; second valve means movable between a closed and an open position in which said second valve means is adapted to direct fluid under pressure to a second brake means and including a second spring biased member operable to open said second valve means upon stressing of its spring, said second valve means being arranged laterally from said first valve means; operator controlled operating means movable by the operator in one direction from a rest position to a first operating position for operating said first spring biased member so as to open said first valve means and to a second operating position for actuating said second spring biased member to open said second valve means while keeping said first valve means open, said operating means including a lever extending between and abutting with laterally spaced abutting portions thereof against said spring biased members of said first and second valve means, and an operating member pivotally connected to said lever between said laterally spaced abutting portions thereof and movable by the operator in said one direction; first spring means engaging said operating means and permanently tending to move the same from said operating to said rest position thereof; a tension spring operatively connected to said lever between the connecting point of said operating member and one of said abutting portions and tending to tilt said lever about said connecting point in a direction so as to keep said one abutting portion away from the corresponding spring biased member during movement of said operating means from said rest to said first operating position so that the spring of the spring biased member cooperating with said one abutting portion will be stressed and the corresponding valve opened only after said operating means is moved by the operator from said first to said second operating position; second spring means biased to resist movement of said operating means when connected to the same from said first to said second operating position; and connecting means arranged on said operating means in such a manner as to be engaged by said second spring means only at the moment when said operating means has been moved by the operator from said rest to said first operating position thereof and to remain in such engagement and connect said second spring means to said operating means during movement of said operating means by the operator between said first and said second operating positions, whereby said second spring means resists movement of said operating means from said first to said second operating position thereof.

4. A braking arrangement comprising, in combination, first valve means movable between a closed and an open position in which said first valve means is adapted to direct fluid under pressure to a first brake means and including a first spring biased member operable to open said first valve means upon stressing of its spring; second valve means movable between a closed and an open position in which said second valve means is adapted to direct fluid under pressure to a second brake means and including a second spring biased member operable to open said second valve means upon stressing of its spring, said second valve means being arranged laterally from said first valve means; operator controlled operating means movable by the operator in one direction from a rest position to a first operating position for operating said first spring biased member so as to open said first valve means and to a second operating position for actuating said second spring biased member to open said second valve means while keeping said first valve means open, said operating means including a lever extending between and abutting with laterally spaced abutting portions thereof against said spring biased members of said first and second valve means, and an operating member pivotally connected to said lever between said laterally spaced abutting portions thereof and movable by the operator in said one direction; first spring means engaging said operating means and permanently tending to move the same from said operating to said rest position thereof; a tension spring operatively connected to said lever between the connecting point of said operating member and one of said abutting portions and tending to tilt said lever about said connecting point in a direction so as to keep said one abutting portion away from the corresponding spring biased member during movement of said operating means from said rest to said first operating position so that the spring of the spring biased member cooperating with said one abutting portion will be stressed and the corresponding valve opened only after said operating means is moved by the operator from said first to said second operating position; second spring means biased to resist movement of said operating means when connected to the same from said first to said second operating position; and connecting means for connecting said second spring means to said operating means, said connecting means comprising a double-armed lever pivoted between the ends thereof and having a first arm pivotally connected at one end thereof to said operating member and a second arm having a free end spaced in the rest position of said operating means from said second spring means and engaging the latter during movement of said operating means between said first and second operating positions thereof, so that said connecting means connects said second spring means to said operating means only during movement of said operating means between said first and said second operating position thereof, the other end of said tension spring being connected to said first arm.

5. A braking arrangement comprising, in combination, first valve means movable between a closed and an open position in which said first valve means is adapted to direct fluid under pressure to a first brake means and including a first spring biased member operable to open said first valve means upon stressing of its spring; second valve means movable between a closed and an open position in which said second valve means is adapted to direct fluid under pressure to a second brake means and including a second spring biased member operable to open said second valve means upon stressing of its spring, said second valve means being arranged laterally from said first valve means; operator controlled operating means movable by the operator in one direction from a rest position to a first operating position for operating said first spring biased member so as to open said first valve means and to a second operating position for actuating said second spring biased member to open said second valve means while keeping said first valve means open, said operating means including a lever extending between and abutting with laterally spaced abutting portions thereof against said spring biased members of said first and second valve means, and an operating member pivotally connected to said lever between said laterally spaced abutting portions thereof and movable by the operator in said one direction; first spring means engaging said operating means and permanently tending to move the same from said operating to said rest position thereof; a tension spring operatively connected to said lever between the connecting point of said operating member and one of said abutting portions and tending to tilt said lever about said connecting point in a direction so as to keep said one abutting portion away from the corresponding spring biased member during movement of said operating means from said rest to said first operating position so that the spring of the spring biased member cooperating with said one abutting portion will be stressed and the corresponding valve opened only after said operating means is moved by the operator from said first to said second operating position; and second operating means engaging said lever in the region of the other abutting portion thereof for tilting said lever about said connecting point upon operating of said second operating means so as to actuate the spring biased member cooperating with the other abutting portion to open the valve means cooperating therewith while leaving the other valve means closed.

References Cited in the file of this patent
UNITED STATES PATENTS

| | | |
|---|---|---|
| 2,092,364 | Stevens | Sept. 7, 1937 |
| 2,206,656 | Boldt | July 2, 1940 |
| 2,355,612 | Vorech | Aug. 15, 1944 |
| 2,392,729 | Edge | Jan. 8, 1946 |
| 2,680,654 | Edge et al. | June 8, 1954 |